United States Patent Office 3,584,005
Patented June 8, 1971

3,584,005
CRYSTALLIZATION OF ACETAZOLAMIDE AND PRODUCT
Charles J. La Blonde, Madison, Wis., Shailesh Parekh, Bombay, India, and Paul Mark Premo, Mill Valley, Calif., assignors to American Cyanamid Company, Stamford, Conn.
No Drawing. Filed Dec. 13, 1968, Ser. No. 783,734
Int. Cl. C07d 91/62
U.S. Cl. 260—306.8                              3 Claims

ABSTRACT OF THE DISCLOSURE

Mixtures of acetazolamide crystals characterized by a binodal size distribution. The mixtures are obtained by adding seed crystals of acetazolamide to saturated solutions thereof and cooling and agitating the resultant mixtures. The mixtures are suitable for preparing dosage units of acetazolamide.

---

This invention relates to a process for producing a mixture of varying size crystals having a binodal size distribution and to the crystalline product produced thereby. More particularly, the present invention relates to crystals mixtures of 2-acetylamino-1,3,4-thiadiazole - 5 - sulfonamide, said mixtures having a binodal size distribution and to a process employing a single crystallization step for producing said mixtures.

The compound, 2-acetylamino - 1,3,4-thiadiazole-5-sulfonamide, hereinafter referred to as "acetazolamide," is useful as a diuretic and for the treatment of glaucoma. Acetazolamide is commonly administered in tablet or granular form which are prepared from acetazolamide crystals. When preparing acetazolamide in granular dosage units, it is desirable to have varying size crystals so that a sustained release of active material is attained during use. Furthermore, it is desirable to employ acetazolamide having substantial amounts of both small and large crystals in order to prepare cohesive and chip resistant tablets. However, since the present techniques for preparing acetazolamide crystals result in crystal mixtures having a mononodal size distribution, it is necessary to either granulate or grind the crystals to obtain a crystal size distribution suitable for preparing desirable administrable forms thereof.

The art of crystal growth of inorganic chemical compounds in general and of particular organic chemical compounds has developed to a considerable extent. Within this art, methods are known for producing uniformly sized crystals. These methods usually are similar for all compounds and involve special techniques, specific equipment, particular additives, etc. to accomplish the desired result. Thus, the crystallizing medium, the degree of solution supersaturation, the degree of supercooling of the medium, the rate of evaporation of the medium, the presence of seed crystals, the equipment employed, the presence or absence of agitation during crystal formation, etc. can all be altered to some extent to influence the size and particle size distribution of the crystals grown. In some cases, the crystal habit can also be altered by recourse to special additives or different crystallizing media.

Certain general rules have evolved from present knowledge of crystal growth. For example, high degrees of supercooling and supersaturation in the absence of agitation tend to lead to large crystals sizes with wide particle size distribution. The use of agitation in such cases tends to reduce particle size slightly and reduces the particle size range so that smaller, more uniform crystals are obtained. Seeding of crystallizing solutions also tends to promote large crystal sizes and agitation again helps control particle size distribution. Such rules apply generally to inorganic chemicals and to widely used organic chemicals with which practical experience has been gained.

Many of the techniques of influencing crystal growth of inorganic compounds are not appropriate for organic compounds due to the limited solubility of many organic compounds and particularly because of their solubility in unusual solvents in preference to water. Even among those crystalline organic compounds of reasonable water solubility, generally accepted methods for influencing crystal growth for inorganic compounds are often not applicable. Recourse is generally had to other methods of influencing crystal size of organic compounds. Thus, where larger particles of acetazolamide are desired, granulation procedures have been devised. Where smaller particles of acetazolamide are desired, grinding methods are employed. Such procedures are time consuming and are therefore uneconomical.

It is an object of the present invention to provide acetazolamide crystal mixtures having a binodal size distribution. It is a further object of the present invention to prepare acetazolamide crystal mixtures having a binodal size distribution in a single crystallization step. Further objects of this invention will become apparent from the following description.

It has now been discovered that seeding of saturated solutions of acetazolamide with crystals of a particular size, with agitation, results in formation of crystals of two predominant sizes (binodal distribution), each different in size from the seed crystals. This result is surprising in view of the fact that it is unknown in those areas of the art where crystal growth technology is available. It is also surprising in view of the fact that the binodal size distribution is not obtained in the absence of agitation. The acetazolamide crystal mixtures having binodal size distribution obtained by the process of this invention are useful to produce dosage units in granular form, in solution, or in tablet form by tabletization with or without previous treatment thereof.

As stated above, the compositions of this invention are characterized by a binodal size distribution. That is, a plot of the percentage of particles versus particle size shows two peaks in the distribution are obtained. The peak for the smaller size range particles occurs at an average particle size of between about $200\mu$ and about $300\mu$. The peak for the larger size range particles occurs at an average particle size of between about $1000\mu$ and about $1500\mu$. The difference between the average size of the smaller and larger peak size range particles is between about $800\mu$ and about $1200\mu$.

The compound of the present invention, 2-acetylamino-1,3,4-thiadiazole-5-sulfonamide, is produced by reaction of ammonium thiocyanate and hydrazine sulfate to form N,N'-bis(thiocarbamyl)hydrazine, which is cyclized with concurrent acetylation to yield 2-acetylamino-5-mercapto-1,3,4-thiadiazole which, in turn, is converted by oxidative chlorination to the chlorosulfonyl intermediate. The chlorosulfonyl intermediate is converted to the amide by reaction with ammonia. The product is obtained in crude form in aqueous solution from which, after suitable purification, it is obtained in the form of fine crystals from an aqueous medium containing hydrochloric acid and carbon dioxide as for example as disclosed by U.S. Pats. 2,554,816, 2,759,947 and 2,823,208.

According to the process of the present invention, a saturated solution of acetazolamide is seeded with from about 0.25 to about 10.0%, preferably from about 0.5 to about 5.0% by weight of seed crystals based on the weight of acetazolamide in solution. The solution is allowed to crystallize by cooling while maintaining agitation. The seed crystals useful in the process of the present invention can be the crystals normally obtained by present methods for crystallizing acetazolamide. The size of the seeds can be varied over wide limits depending upon the ultimate binodal size distribution desired. Thus, crystals of average length dimension of about 5μ to 2000μ may be employed as seed crystals. For the particular case where the ultimate crystals are to be used for tabletization, the seed crystals have an average length dimension preferably in the range of from about 60μ to about 1000μ.

The rate of cooling of the saturated solution can vary within a wide range. It should not be so fast as to produce undesirably small crystals nor so slow as to require inordinate periods of time to recover the crystal product. Desirable rates of cooling which can be employed to produce the crystal product of this invention are within the range of about 0.2° C./minute and about 1° C./minute.

As stated above, the saturated solution must be moderately agitated to produce mixed crystals having a binodal size distribution. Excessive agitation causes the production of undesirably small crystals having an average particle size less than 50 microns while insufficient agitation causes the production of undesirably large crystals having an average particle size greater than about 2500 microns. Crystalline products having the desired size distribution are obtained when employing an agitation rate within the range of about 60 to about 150 r.p.m.

Suitable solvents for acetazolamide which can be employed in the present invention are those which are unreactive with acetazolamide and can dissolve substantial concentrations thereof and include water, ethyl acetate, ethanol, ethylene chloride, petroleum ether, acetone and aqueous acetone. The amount of acetazolamide present in the crystallizing medium will be sufficient to form saturated solutions of acetazolamide at or near the boiling point of the solvent. When employing water, the preferred crystallizing medium, the amount of acetazolamide present is between about 1 and about 3 parts per 100 parts by weight of water.

In accordance with one embodiment of this invention, acetazolamide can be produced in the manner described above except that the final crystallization step is conducted in the absence of acid and carbon dioxide is eliminated. The effect of this change is to increase to some extent the size of the crystals obtained and to provide a preferred environment for ultimate crystal growth.

As stated above, the rate of cooling will influence the particle size and distribution. When the crystals are to be tabletized, it is preferred to effect crystallization while cooling to normal room temperature of from between about 100° C. to about 20° C. After crystallization is complete, the crystals are separated from the mother liquor by suitable means such as filtration, centrifugation or decantation and dried.

The following examples illustrate the present invention and are not intended to limit the same.

EXAMPLE 1

Preparation of acetazolamide by conventional method

To 130 parts of monohydrazine sulfate

(NH₂NH₂.H₂SO₄

1.0 mole) slurried in about 100 parts of water are added about 30 parts of sodium hydroxide, the amount of caustic being insufficient to complete the conversion of monohydrazine sulfate to dihydrazine sulfate

(2NH₂NH₂.H₂SO₄)

and a catalytic amount (4 parts) of hypophosphorous acid. To this mixture is added 152 parts (2.0 moles) of ammonium thiocyanate as a 75% aqueous solution. The addition is made with stirring and at a temperature of 90° to 100° C. The reaction mixture is heated to reflux (100° to 110° C.) and maintained at reflux for about one hour. The reaction mixture is then allowed to cool to 99° to 100° C. and about 60 parts of concentrated sulfuric acid (98 to 100%) are added. The reaction mixture is again heated to reflux and maintained at reflux for about 5 hours. The intermediate, N,N'-bis(thiocarbamyl) hydrazine, is separated and washed.

EXAMPLE 2

To 1000 parts of water at 95° C. is added 21.0 parts of the crystals obtained from Example 1 while the mixture is being stirred to form a saturated solution of acetazolamide. When solution is complete, the stirring is stopped and crystallization allowed to proceed by air-cooling. The mixture of crystal obtained has an average particle size of 800μ and a typical mononodal size distribution. These crystals are used as seeds in other crystallization processes set forth in the examples which follow.

EXAMPLE 3

Preparation of crystals of binodal distribution

To 1000 parts of water at 95° C. is added 21.0 parts of the crystals obtained from Example 1 while the mixture is being stirred to form a saturated solution of acetazolamide. When solution is complete, it is allowed to cool to about 90° C. at which point 0.318 part of the seed crystals from Example 2 are added. Crystallization from the mother liquor has not begun at this point. The solution is allowed to cool under the influence of the surrounding air while maintaining moderate stirring. After crystallization is essentially complete, the crystals are separated from the mother liquor by centrifugation and dried at ambient conditions. The crystal mixture obtained shows a binodal size distribution as indicated in Table I.

TABLE I

Binodal particle size distribution

| Particle size (μ): | Percent of total crystals |
|---|---|
| 100 | 3.6 |
| 100–200 | 5.4 |
| 200–300 | 12.6 |
| 300–400 | 9.7 |
| 400–500 | 8.2 |
| 500–600 | 6.5 |
| 600–700 | 7.1 |
| 700–800 | 8.7 |
| 800–900 | 9.4 |
| 900–1000 | 10.9 |
| 1000–1500 | 14.7 |
| 1500–2000 | 3.2 |
| 2000 | 0.0 |

A plot of the percentage of particles against the particle size shows that two peaks in the distribution are obtained, one at an average size of 200μ and the second at an average size of 1300μ.

EXAMPLE 4

The procedure of Example 3 was repeated except that during crystallization no stirring was employed. The crystals obtained had an average length of 700μ with minor amounts of crystals of particle sizes ranging from 50μ to 3500μ as shown in the following Table II. A plot of the percentage of particles against the particle size shows a single peak in the distribution at 700μ.

TABLE II

Mononodal particle size distribution

| Particle size (μ) | Percent of total crystals |
|---|---|
| 50–100 | 1.5 |
| 100–200 | 2.1 |
| 200–300 | 4.7 |
| 300–400 | 9.1 |
| 400–500 | 15.3 |
| 500–1000 | 22.6 |
| 1000–1500 | 18.9 |
| 1500–2000 | 11.6 |
| 2000–2500 | 7.7 |
| 2500–3000 | 4.5 |
| 3000–3500 | 2.0 |

What is claimed is:

1. A process for producing a mixture of varying sized crystals of 2-acetylamino-1,3,4-thiadiazole-5-sulfonamide, said mixture exhibiting a binodal size distribution, comprising
(1) seeding a saturated solution of 2-acetylamino-1,3,4-thiadiazole-5-sulfonamide with from about 0.25% to about 10% of seed crystals of 2-acetylamino-1,3,4-thiadiazole-5-sulfonamide having an average particle size of from about 5μ to 2,000μ, based on the weight of said 2-acetylamino-1,3,4-thiadiazole-5-sulfonamide in said solution;
(2) cooling the seeded solution at a rate ranging from about 0.2° C./min. to about 1° C./min.;
(3) continuously agitating said seeded solution to effect crystallization of said 2-acetylamino-1,3,4-thiadiazole-5-sulfonamide within a particle size range of from about 50 to about 2,500 microns in a binodal mode.

2. The process of claim 1 wherein the seed crystals have an average particle size of from about 60μ to about 1,000μ.

3. A 2-acetylamino-1,3,4-thiadiazole-5-sulfonamide mixture exhibiting a binodal size distribution, said mixture being obtained by the process of claim 1.

References Cited

UNITED STATES PATENTS

| 2,759,947 | 8/1956 | Song et al. | 260—306.8 |
| 2,823,208 | 2/1958 | Song | 260—306.8 |

OTHER REFERENCES

R. S. Tipson: Technique of Organic Chemistry, vol. III, Interscience, 1950, pp. 445–51.

ALEX MAZEL, Primary Examiner

R. J. GALLAGHER, Assistant Examiner

U.S. Cl. X.R.

260—707, 999